Oct. 10, 1961  G. A. MARCHIONDA ET AL  3,003,799
OIL RETAINER FOR ROTATING AND SLIDING AXLES
Filed Feb. 4, 1957  2 Sheets-Sheet 1

INVENTORS
Gerardo Alberto Marchionda
Alberto Molin
BY Ivan P. Tashof
Attorney

Oct. 10, 1961  G. A. MARCHIONDA ET AL  3,003,799
OIL RETAINER FOR ROTATING AND SLIDING AXLES
Filed Feb. 4, 1957  2 Sheets-Sheet 2

INVENTORS
Gerardo Alberto Marchionda
Alberto Molins
BY
Attorney

United States Patent Office 3,003,799
Patented Oct. 10, 1961

3,003,799
OIL RETAINER FOR ROTATING AND SLIDING AXLES
Gerardo A. Marchionda and Alberto Molins, both of 3045 Ramon L. Falcon St., Buenos Aires, Argentina
Filed Feb. 4, 1957, Ser. No. 637,965
3 Claims. (Cl. 288—2)

The subject of this invention is an oil retainer for rotating or sliding axles.

Its main purpose is to produce a retainer with perfect adjustment to the axle without resource to elastic mediae, such as springs, coupling rings, clamps or other means.

Another objective is to produce a retainer which will prevent the passage of dust into the coupling between the latter and the axle.

Another important aim is to produce a retainer whose flexibility enables it to readjust itself automatically in the corresponding socket of the axle guide or support.

For a clearer understanding of the nature of this invention, several illustrations are shown of the new retainer, produced according to one of the methods most currently used.

In the accompanying drawings, forming a part of this application, and in which like numerals are used to designate like parts throughout the same:

In the diverse illustrations, the same signs refer to equal or corresponding elements or parts.

Figure 1:
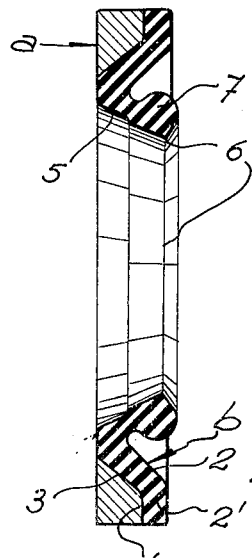
FIG. 1 shows a side view of a longitudinal section I—I.
Figure 3:
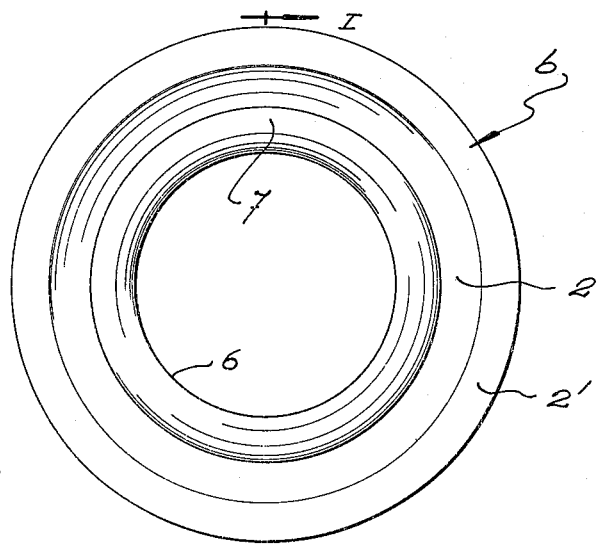
FIG. 3 is a front view.

As shown in FIGS. 1 to 7, the retainer consists of two rings joined together into a single unit. The first ring being used to fasten the retainer into socket 1 of the guide or support $c$ of axle $d$, on which the retainer is to be mounted.

This first ring $a$ has a transverse section similar to a trapezoid and is composed of a rigid thermo-setting synthetic resin material such as sold under the trademark "Micarta," having the property of adhering to the rubber by means of heat and pressure, with or without the use of adhesive elements.

The second ring $b$ for elastic adjustment on axle $d$ is of flexible rubber and has a transverse section similar to the letter V.

This elastic adjustment ring is enclosed in the fastening ring $a$ and adhered to the internal conic surface 3 of this ring by means of its outer wing 2 and to the lateral surface 4 of fastening ring $a$ by means of a circular peripheral rim 2' of wing 2. The second ring $b$ covers the first ring $a$ on this side to thereby form an elastic seat for the purpose of establishing an air-tight coupling between fastening ring $a$ and the bottom of socket 1 of the guide or support $c$ of axle $d$.

The inner wing of adjustment ring $b$ is free and highly flexible and runs obliquely with regard to the geometric axis of the retainer, presenting on its periphery on the internal adjustment side against axle $d$, an angled border 6 establishing contact with the axle. On the opposite side of this angled border 6, it has a wide circular rim 7 that reduces the flexibility of the periphery of the aforementioned ring, thus ensuring the secure adjustment of this wing against the axle by means of the contact border 6.

The method preferentially used in the manufacture of this retainer is to make the elastic adjustment ring $b$ by melting it directly on to the fastening ring $a$, placed in a suitable mould.

Figure 6:
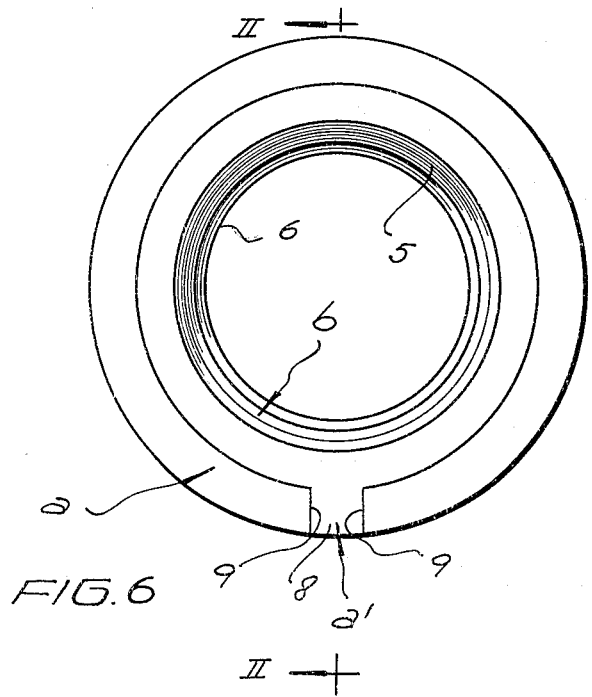
FIG. 6 is a back view of the retainer shown in FIGS. 4 and 5.
Figure 5:
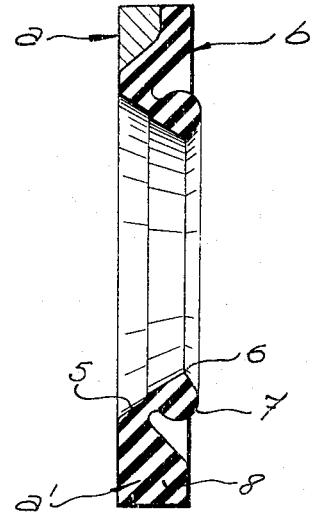
FIG. 5 is view of a longitudinal section II—II of the retainer shown in FIG. 6.
Figure 4:
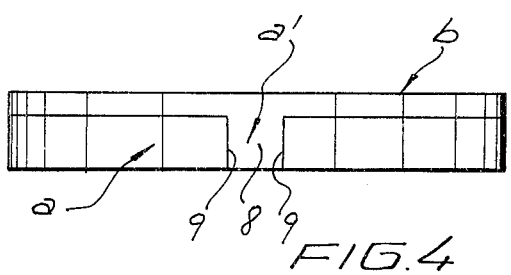
FIG. 4 is a side view of the retainer, displaying one of the modifications.

In the modifications shown in FIGS. 4 to 6, the fastening ring $a$ is not a complete circle, as in the examples 1 to 3. The missing part of the circle is filled in by a projection 8 of the outer wing 2 of elastic adjustment ring $b$ and adhered to the ends 9 of the ring resulting from the interruption. This projection forms an elastic zone $a'$ in the fastening ring $a$ that permits the exercise of radial pressure in order slightly to reduce its diameter, thus making possible its insertion into a socket 1 of the same diameter, so that, once enclosed, it will expand elastically and adjust itself perfectly within.

Figure 7:
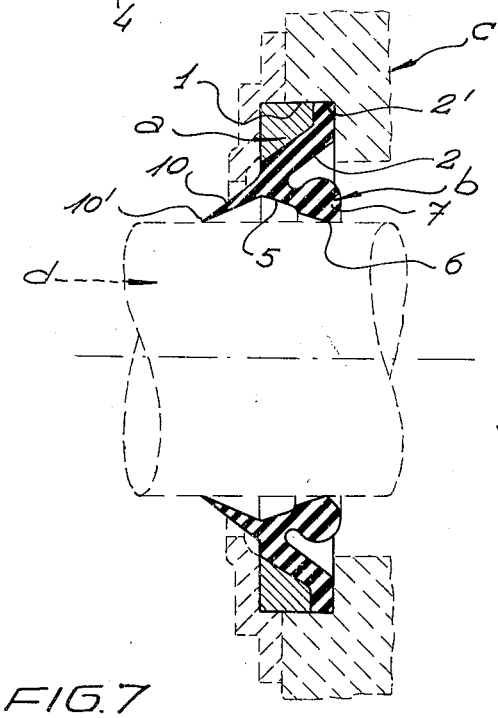
FIG. 7 is a similar view to that of FIG. 2, showing a third variation of the retainer.
Figure 2:
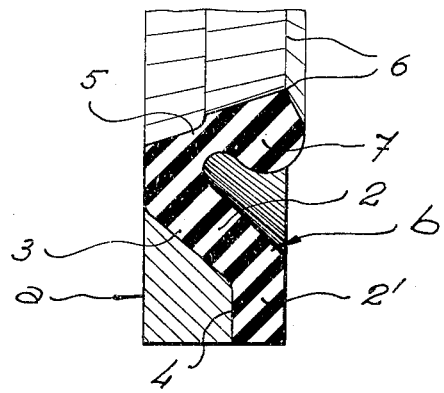
FIG. 2 is a partial view on a larger scale of FIG. 1.

In the second variation of FIG. 7, the elastic adjustment ring $b$ has been provided with a fine and flexible rib 10 which points to the opposite side of inner wing 5 of this ring and adapts itself by means of periphery 10' of its internal surface to axle $d$, thus preventing dust, dirt, or any liquid or solid element from reaching the contact zone between the elastic adjustment ring by and the axle $d$.

Figure 8:
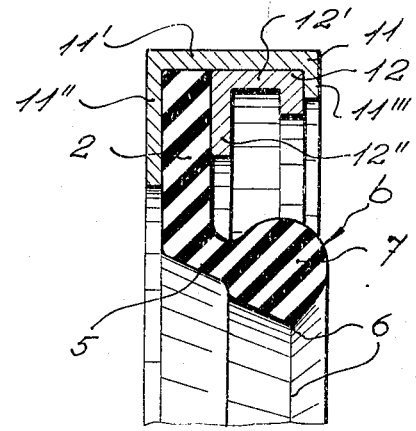
FIG. 8 is similar view to FIG. 2, in accordance with a fourth variation of the retainer.

In the example of FIG. 8, the fastening ring $a$ of the retainer seen in the previous illustrations, has been replaced by two L-section metallic rings, one being an outer ring 11 and another being an inner ring 12 which are juxtaposed by means of their respective circular wings 11' and 12' and which pin down between them by means of the other 11" and 12" the outer wing 2 of the elastic adjustment ring $b$ which in this case has been provided with a wider V section than in the previous instance.

Outer ring 11 holds inner ring 12 in its held down position by means of the internal circular rib 11" of its circular wing 11' which is doubled across a similar rib of the same wing of the internal ring 12.

Undoubtedly, when this invention is applied in practice, certain modifications may be introduced as regards certain details of construction and shape of the oil container for rotating or sliding axles. However, this may be done providing there is no deviation from the fundamental principles which are specifically and clearly established in the clauses of the following claims.

Having thus described and determined the nature and scope of this invention and the way in which it may be put into practice, we hereby claim as our exclusive property and right:

1. An oil retainer for rotating and sliding axles comprising a rigid fastening ring of generally trapezoidal cross section, said ring having a first lateral face, a second opposed lateral face, and a tapered inner surface extending between said lateral faces, said inner surface tapering outwardly from said second face to said first face, a V-shaped flexible and elastic adjustment ring having an inner wing and an outer wing, the outer surface of said outer ring abutting said tapered inner surface with the free end of said outer wing having a lateral peripheral rim secured to said first face of said rigid fastening ring, the inner wing being inclined to the axis of said retainer, said inner wing having adjacent its free end an inwardly directed angled border, said border being adapted to contact the axle to provide a seal therewith, said angled border being the inermost portion of said inner wing between the extremity of said free end and the apex of said V, and a thickened rib opposite said angled border on the outer side of said inner wing, said thickened rib strengthening the free end of said inner wing.

2. An oil retainer as defined in claim 1, wherein said fastening ring does not define a complete annulus whereby said fastening ring is provided with two opposed free ends, the space between said free ends being filled by a projection of said outer wing.

3. An oil retainer as defined in claim 1, wherein said adjustment ring includes an inwardly extending flexible rib extending from the apex of the V in a direction opposite from the free end of said inner wing, the edge of said rib being adapted to contact the surface of the axle.

References Cited in the file of this patent

UNITED STATES PATENTS

| | | |
|---|---|---|
| 1,875,936 | Saunders | Sept. 6, 1932 |
| 1,969,797 | Hubbard et al. | Aug. 14, 1934 |
| 2,080,670 | Nelson | May 18, 1937 |
| 2,294,105 | Wallgren | Aug. 25, 1942 |
| 2,471,679 | Gardner | May 31, 1949 |
| 2,509,151 | Kasten | May 23, 1950 |
| 2,523,604 | Vedovell | Sept. 6, 1950 |
| 2,619,369 | Williams | Nov. 25, 1952 |
| 2,846,247 | Davis | Aug. 5, 1958 |

FOREIGN PATENTS

| | | |
|---|---|---|
| 112,851 | Sweden | Jan. 2, 1945 |
| 875,744 | Germany | July 8, 1949 |
| 742,211 | Great Britain | Dec. 21, 1955 |